United States Patent
Kumar et al.

(10) Patent No.: US 10,026,076 B2
(45) Date of Patent: Jul. 17, 2018

(54) SYSTEMS, METHODS, AND COMPUTER READABLE MEDIA FOR PAYMENT AND NON-PAYMENT VIRTUAL CARD TRANSFER BETWEEN MOBILE DEVICES

(75) Inventors: Pradeep Kumar, Fremont, CA (US); Mohammad Khan, San Jose, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 500 days.

(21) Appl. No.: 12/574,696

(22) Filed: Oct. 6, 2009

(65) Prior Publication Data

US 2010/0088188 A1     Apr. 8, 2010

Related U.S. Application Data

(60) Provisional application No. 61/103,083, filed on Oct. 6, 2008.

(51) Int. Cl.
  *G06Q 20/00*     (2012.01)
  *G07F 19/00*     (2006.01)
  (Continued)

(52) U.S. Cl.
  CPC ......... *G06Q 20/351* (2013.01); *G06Q 20/10* (2013.01); *G06Q 20/105* (2013.01); *G06Q 20/202* (2013.01); *G06Q 20/204* (2013.01); *G06Q 20/223* (2013.01); *G06Q 20/32* (2013.01); *G06Q 20/3278* (2013.01)

(58) Field of Classification Search
  None
  See application file for complete search history.

(56) References Cited

U.S. PATENT DOCUMENTS 5,884,271 A    3/1999 Pitroda
6,078,820 A    6/2000 Wells et al.
(Continued)

FOREIGN PATENT DOCUMENTS

AP          3452         10/2015
AU     2009282041         10/2015
(Continued)

OTHER PUBLICATIONS

"Idea: OnlineSecure Electronic Prepaid Virtual Debit Card," http://www.ideablob.com, 3 pages (Copyright 2007-2009).
(Continued)

*Primary Examiner* — Ariel J Yu
(74) *Attorney, Agent, or Firm* — Jenkins, Wilson, Taylor & Hunt, P.A.

(57) ABSTRACT

The subject matter described herein includes methods, systems, and computer readable media for virtual card transfer between near field communications (NFC)-enabled mobile devices. According to one aspect, a method for over-the-air (OTA) virtual card transfer between NFC-enabled mobile devices is disclosed. The method includes receiving, at an OTA provisioning server, a virtual card, from a sending mobile device, that is intended for a receiving mobile device. The virtual card is provisioned, over the air, to the receiving mobile device, where the virtual card is immediately presentable by the receiving mobile device at a point of sale terminal.

33 Claims, 8 Drawing Sheets

(51) Int. Cl.
*G07B 17/00* (2006.01)
*G06Q 20/34* (2012.01)
*G06Q 20/10* (2012.01)
*G06Q 20/20* (2012.01)
*G06Q 20/22* (2012.01)
*G06Q 20/32* (2012.01)

(56) References Cited

U.S. PATENT DOCUMENTS

| | | |
|---|---|---|
| 6,592,044 B1 | 7/2003 | Wong et al. |
| 6,793,135 B1 | 9/2004 | Ryoo |
| 7,031,693 B2 | 4/2006 | Öhrström et al. |
| 7,103,572 B1 | 9/2006 | Kawaguchi et al. |
| 7,127,236 B2 | 10/2006 | Khan et al. |
| 7,413,113 B1 | 8/2008 | Zhu |
| 7,469,151 B2 | 12/2008 | Khan et al. |
| 7,942,337 B2 | 5/2011 | Jain |
| 7,954,717 B2 | 6/2011 | Narendra et al. |
| 7,962,369 B2* | 6/2011 | Rosenberg ............ G06Q 20/20 705/26.1 |
| 8,165,635 B2 | 4/2012 | Khan et al. |
| 8,620,299 B2 | 12/2013 | Kumar |
| 9,767,452 B2 | 9/2017 | Khan et al. |
| 2002/0026367 A1 | 2/2002 | Villaret et al. |
| 2002/0161640 A1 | 10/2002 | Wolfe |
| 2003/0004808 A1* | 1/2003 | Elhaoussine et al. ......... 705/14 |
| 2003/0101246 A1 | 5/2003 | Lahti |
| 2003/0199265 A1 | 10/2003 | Aoyama et al. |
| 2004/0029569 A1 | 2/2004 | Khan et al. |
| 2004/0072592 A1 | 4/2004 | Hasegawa |
| 2004/0131185 A1 | 7/2004 | Kakumer |
| 2004/0181463 A1 | 9/2004 | Goldthwaite et al. |
| 2004/0243519 A1* | 12/2004 | Perttila et al. ................. 705/75 |
| 2005/0041793 A1 | 2/2005 | Fulton et al. |
| 2005/0070251 A1* | 3/2005 | Satake ............... H04L 12/1859 455/411 |
| 2005/0070257 A1 | 3/2005 | Saarinen et al. |
| 2005/0079912 A1 | 4/2005 | Hanafusa |
| 2006/0023856 A1 | 2/2006 | Welton |
| 2006/0080111 A1 | 4/2006 | Homeier-Beals |
| 2006/0080232 A1 | 4/2006 | Epps |
| 2006/0163343 A1 | 7/2006 | Changryeol |
| 2006/0165060 A1 | 7/2006 | Dua |
| 2006/0236325 A1 | 10/2006 | Rao et al. |
| 2006/0287964 A1 | 12/2006 | Brown |
| 2007/0042756 A1 | 2/2007 | Perfetto et al. |
| 2007/0050871 A1 | 3/2007 | Mashhour |
| 2007/0087765 A1 | 4/2007 | Richardson et al. |
| 2007/0099599 A1 | 5/2007 | Smith et al. |
| 2007/0152829 A1 | 7/2007 | Lindsay et al. |
| 2007/0241183 A1 | 10/2007 | Brown et al. |
| 2007/0255662 A1* | 11/2007 | Tumminaro .................... 705/79 |
| 2008/0040265 A1 | 2/2008 | Rackley, III et al. |
| 2008/0040354 A1 | 2/2008 | Ray et al. |
| 2008/0052164 A1 | 2/2008 | Abifaker |
| 2008/0058014 A1 | 3/2008 | Khan et al. |
| 2008/0126145 A1 | 5/2008 | Rackley, III et al. |
| 2008/0167961 A1 | 7/2008 | Wentker et al. |
| 2008/0195473 A1 | 8/2008 | Laramy et al. |
| 2008/0201226 A1 | 8/2008 | Carlson et al. |
| 2008/0207184 A1* | 8/2008 | Wassingbo et al. .......... 455/417 |
| 2008/0208762 A1* | 8/2008 | Arthur et al. ................... 705/79 |
| 2008/0238610 A1 | 10/2008 | Rosenberg |
| 2008/0257958 A1 | 10/2008 | Rothwell et al. |
| 2008/0262928 A1* | 10/2008 | Michaelis ............. G06Q 30/02 705/14.26 |
| 2009/0006254 A1* | 1/2009 | Mumm et al. .................. 705/44 |
| 2009/0150211 A1* | 6/2009 | Bayne ................. G06Q 30/00 705/14.17 |
| 2009/0164322 A1 | 6/2009 | Khan et al. |
| 2009/0192928 A1* | 7/2009 | Abifaker ............. G06Q 30/02 705/35 |
| 2009/0216606 A1 | 8/2009 | Coffman et al. |
| 2010/0041368 A1 | 2/2010 | Kumar |
| 2010/0063906 A1* | 3/2010 | Nelsen et al. .................. 705/30 |
| 2010/0070364 A1* | 3/2010 | Dugan ................. G06Q 30/02 705/14.43 |
| 2011/0296182 A1 | 12/2011 | Jia et al. |
| 2012/0254030 A1 | 10/2012 | Khan et al. |
| 2017/0352051 A1 | 12/2017 | Watkins et al. |
| 2017/0357963 A1 | 12/2017 | Khan et al. |

FOREIGN PATENT DOCUMENTS

| | | |
|---|---|---|
| AU | 2009302485 | 10/2015 |
| CA | 2 546 911 | 11/2007 |
| CA | 2 546 911 A1 | 11/2007 |
| CN | 200780040617.4 | 11/2012 |
| CN | 102845040 B | 5/2016 |
| EP | 1 528 827 A2 | 5/2005 |
| EP | 2 062 219 B1 | 7/2015 |
| ID | P 000 036 470 B | 7/2014 |
| JP | 2002-073841 | 3/2002 |
| JP | 2003271815 | 9/2003 |
| JP | 2006040249 | 2/2006 |
| JP | 2006-163466 | 6/2006 |
| JP | 2007-148593 A | 6/2007 |
| JP | 2008-186297 | 8/2008 |
| JP | 6195637 B | 8/2017 |
| KR | 10-2000-0054540 | 9/2000 |
| KR | 10-2002-0096353 | 12/2002 |
| KR | 10-2003-0000447 | 1/2003 |
| KR | 2003-0068226 | 8/2003 |
| KR | 10-2003-0080111 | 10/2003 |
| KR | 10-2004-0000712 | 1/2004 |
| KR | 10-2004-0110659 | 12/2004 |
| KR | 10-2006-0022864 | 3/2006 |
| KR | 10-2006-0101240 | 9/2006 |
| KR | 10-2007-0030351 | 3/2007 |
| KR | 10-1802303 | 11/2017 |
| MX | 319439 | 4/2014 |
| MX | 336935 | 2/2016 |
| MY | 163850 A | 10/2017 |
| SG | 168926 | 9/2013 |
| SG | 170317 | 10/2013 |
| WO | WO 03/024139 A2 | 3/2003 |
| WO | WO 03/046742 A1 | 6/2003 |
| WO | WO 2005/086593 A2 | 9/2005 |
| WO | WO 2005/098769 A1 | 10/2005 |
| WO | WO 2005/111882 A1 | 11/2005 |
| WO | WO 2008/030307 A2 | 3/2008 |
| WO | WO 2008/042302 A2 | 4/2008 |
| WO | WO 2009/158681 A1 | 12/2009 |
| WO | WO 2010/019670 A1 | 2/2010 |
| WO | WO 2010/071859 A2 | 6/2010 |
| WO | WO 2013/163185 A1 | 10/2013 |

OTHER PUBLICATIONS

"Mobile Money Transfer Fact Sheet," Western Union, http://corporate.westernunion.com/news_media_MobileMoney.html, 1 page (Copyright 2001-2009).
"EMO™—Electronic Money Orders—How EMO Works," https://www.emocorp.com, 1 page (Copyright 1999-2009).
"EMO™—Electronic Money Orders—Options for Moving Your Money with EMO," https://www.emocorp.com, 1 page (Copyright 1999-2009).
"Mobile Payments with PayPal—Send Money from Your Mobile Phone," https://www.paypal.com, 1 page, (Copyright 1999-2009).
"PayPal Mobile FAQ," https://www.paypal.com, 2 pages (Copyright 1999-2009).
"Texting with PayPal—Easy as Lifting a Finger," https://www.paypal.com, 1 page (Copyright 1999-2009).
Notification of Transmittal of the International Search Report and the Written Opinion of the International Searching Authority, or the Declaration for International Application No. PCT/US2009/059752 (May 20, 2010).
Notification of Transmittal of the International Search Report and the Written Opinion of the International Searching Authority, or the Declaration for International Application No. PCt/US2009/053556 (Apr. 5, 2010).

(56) References Cited

OTHER PUBLICATIONS

Communication of European Publication Number and Information on the Application of Article 67(3) EPC for European Patent No. 2062219 (Apr. 29, 2009).
Notice of Allowability for U.S. Appl. No. 11/514,698 (Nov. 17, 2008).
Notice of Allowance and Fee(s) Due for U.S. Appl. No. 11/514,698 (Aug. 28, 2008).
Notification for Transmittal of the International Search Report and the Written Opinion of the International Searching Authority, or the Declaration for the International Application No. PCT/US07/17091 (Jun. 26, 2008).
Non-Final Official Action for U.S. Appl. No. 12/340,568 (Aug. 8, 2011).
Non-Final Official Action for U.S. Appl. No. 12/190,564 (May 24, 2011).
Notification Concerning Transmittal of International Preliminary Report on Patentability for International Application No. PCT/US2009/059752 (Apr. 21, 2011).
First Office Action for Chinese Patent Application No. 200780040617.4 (Apr. 8, 2011).
Interview Summary for U.S. Appl. No. 12/184,847 (May 5, 2010).
Notification of Transmittal of the International Search Report and the Written Opinion of the International Searching Authority, or the Declaration for International Application No. PCT/US2009/052618 (Mar. 30, 2010).
Official Action for U.S. Appl. No. 12/184,847 (Jan. 6, 2010).
Extended European Search Report for European Application No. 07836358.7 (Sep. 22, 2011).
Communication of European publication number and information on the application of Article 67(3) EPC for European Application No. 09819787.4 (Jul. 6, 2011).
"ViVOnfc Suite," ViVOtech Products, http://www.vivotech.com/products/vivo_nfc/ index.asp, pp. 1-2 (Dec. 31, 2006).
"Giesecke & Devrient provides over the air personalization for handsets with PayPass," NFCNews, pp. 1-2 (Apr. 13, 2006).
Supplemental Notice of Allowability for U.S. Appl. No. 12/340,568 (Feb. 6, 2012).
Notification of Transmittal of the International Search Report and the Written Opinion of the International Searching Authority, or the Declaration for International Application No. PCT/US2009/068875 (Jan. 18, 2012).
Notice of Allowance and Fee(s) Due for U.S. Appl. No. 12/340,568 (Dec. 20, 2011).
Declaration of Mohammad Khan for U.S. Appl. No. 12/340,568 (Dec. 15, 2011).
C-SAM's Answer to Defendant's Counterclaims in the United States District Court for the District of Delaware for Civil Action No. C.A. No. 11-881-GMS (Dec. 15, 2011).
Communication of European publication number and information on the application of Article 67(3) EPC for European Application No. 09833865.0 (Dec. 7, 2011).
Vivotech, Inc.'s Answer, Defenses and Counterclaims in the United States District Court for the District of Delaware for Civil Action No. C.A. No. 11-881-GMS (Nov. 21, 2011).
Final Official Action for U.S. Appl. No. 12/190,564 (Oct. 28, 2011).
Non-Final Official Action for U.S. Appl. No. 12/190,564 (Jun. 4, 2012).
Extended European Search Report for European Application No. 09807223.4 (Jun. 1, 2012).
First Office Action for Chinese Patent Application No. 200980148141.5 (Apr. 23, 2012).
Commonly-assigned, co-pending U.S. Continuation-in-Part U.S. Appl. No. 13/453,707 for "Methods, Systems and Computer Readable Media for Over the Air (OTA) Provisioning of Soft Cards on Devices with Wireless Communications Capabilities," (Unpublished, filed Apr. 23, 2012).
Second Office Action for Chinese Patent Application No. 200780040617.4 (Jan. 18, 2012).

Office Action for Mexican Patent Application No. 2011003425 (Dec. 10, 2014).
Communication under Rule 71(3) EPC for European Patenent Application No. 07836358.7 (Dec. 17, 2014).
Grant Information for Mexican Patent Application No. MX/a/2001/001622 (Apr. 28, 2014).
Communication of European publication number and information on the application of Article 67(3) EPC for European Application No. 13780892.9 (Feb. 4, 2015).
Communication pursuant to Article 94(3) EPC for European Application No. 11 787 521.1 (Oct. 27, 2014).
Non-Final Office Action for U.S. Appl. No. 13/118,046 (Sep. 25, 2014).
Notification of the Fifth Office Action for Chinese Application No. 200980148141.5 (Aug. 29, 2014).
Non-Final Office Action for U.S. Appl. No. 13/170,903 (Aug. 22, 2014).
Examination Report for African Application No. AP/P/2011/005662 (Aug. 7, 2014).
Notification of the First Office Action for Chinese Application No. 200980157050.8 (Aug. 4, 2014).
Examination Report for ARIPO Patent Application No. AP/P/2011/005619 (Jul. 30, 2014).
Notification of Grant for Indonesia Patent Application No. W00 2011 01632 (Jul. 25, 2014).
Communication under Rule 71(3) EPC for European Patent Application No. 07836358.7 (Jul. 2, 2014).
Examination Report for Australian Patent Application No. 2009282041 (Jun. 12, 2014).
Office Action for Japanese Patent Application No. 2011-531127 (Jun. 9, 2014).
Notification of the Fouth Office Action for Chinese Application No. 200980148141.5 (Jun. 4, 2014).
Patent Examination Report No. 1 for Australian Patent Application No. 2009302485 (May 28, 2014).
Verbal Communication for Indonesia Patent Application No. W00 2011 01632 (May 23, 2014).
Official Action for Mexican Patent Application No. MX/a/2011/003425 (May 16, 2014).
Non-Final Office Action for U.S. Appl. No. 13/118,046 (Apr. 16, 2014).
Notification of the Third Office Action for Chinese Application No. 200980140368.5 (Apr. 8, 2014).
Office Action for Indian Application No. 1752/CHENP/2009 (Mar. 27, 2014).
Decision to Refuse for European Application No. 09 807 223.4 (Mar. 18, 2014).
Extended European Search Report for European Application No. 11787521.1 (Feb. 28, 2014).
Notice of Allowance for Mexican Patent Application No. MX/a/2011/001622 (Feb. 20, 2014).
Extended European Search Report for European Application No. 09833865.0 (Dec. 12, 2013).
Result of Consultation for European Application No. 09 807 223.4 (Dec. 6, 2013).
Third Office Action for Chinese Application No. 200980148141.5 (Nov. 7, 2013).
Communication pursuant to Article 94(3) EPC for European Application No. 09 837 222.0 (Oct. 21, 2013).
Third Office Action for Mexican Patent Application No. MX/a/2011/001622 (Oct. 11, 2013).
Final Office Action for U.S. Appl. No. 13/118,046 (Oct. 2, 2013).
Summons to attend oral proceedings pursuant to Rule 115(1) EPC for European Application No. 09807223.4 (Sep. 25, 2013).
Notification of Transmittal of the International Search Report and the Written Opinion of the International Searching Authority, or the Declaration for International Application No. PCT/US2013/037803 (Aug. 21, 2013).
Result of consultation for European Application No. 07 836 358.7 (Jul. 18, 2013).
Second Office Action for Chinese Patent Application No. 200980140368.5 (Jun. 4, 2013).

(56) References Cited

OTHER PUBLICATIONS

Notice of Allowance and Fee(s) Due for U.S. Appl. No. 12/190,564 (Jul. 10, 2013).
Result of Consultation for European Patent Application No. 07836358.7 (Jul. 5, 2013).
Memo Concerning the Official Action for Mexican Patent Application No. MX/a/2011/001622 (Apr. 29, 2013).
Communication Pursuant to Article 94(3) EPC for European Patent Application No. 09807223.4 (Mar. 14, 2013).
Second Office Action for for Chinese Patent Application No. 200980148141.5 (Jan. 31, 2013).
Final Office Action for U.S. Appl. No. 12/190,564 (Jan. 11, 2013).
Memo Concerning the Official Action for Mexican Patent Application No. MX/a/2011/001622 (Oct. 16, 2012).
Chinese Patent Application No. 200780040617.4 for Notice of Granting Patent Right for Invention (Aug. 3, 2012).
Extended European Search Report for European Application No. 09819787.4 (Aug. 1, 2012).
First Office Action for Chinese Patent Application No. 200980140368.5 (Jul. 30, 2012).
Communication pursuant to Article 94(3) EPC for European Application No. 07 836 358.7 (Jul. 4, 2012).
"Notice from the European Patent Office dated Oct. 1, 2007 concerning business methods," Official Journal EPO, pp. 592-593 (Nov. 2007).
Verbal Communication for Indonesia Patent Application No. W00 2011 01632 (Mar. 17, 2014).
Office Action for Malaysian Patent Appication Serial No. PI 2011001548 (dated Jun. 15, 2016).
Decision of Reexamination for Chinese Application No. 200980140368.5 (dated May 30, 2016).
Non-Final Office Action for U.S. Appl. No. 13/453,707 (dated May 19, 2016).
Decision to Refuse a Patent (Final Rejection) for Korean Patent Application No. 10-2011-7009841 (dated May 13, 2016).
Letter Regarding Decision of Reexamination for Chinese Patent Application No. 200980148141.5 (dated Apr. 12, 2016).
Notice of Grant for Chinese Patent Application No. 200980157050.8 (dated Feb. 3, 2016).
Extended European Search Report for European Application No. 13780892.9 (dated Jan. 15, 2016).
Letter Regarding Notice of Allowance for Mexican Patent Application No. MX/a/2011/003425 (dated Jan. 11, 2016).
Office Action for Canadian Application No. 2,734,176 (dated Jan. 6, 2016).
Notification of Reexamination for Chinese Application No. 200980148141.5 (dated Nov. 23, 2015).
Letter Regarding Office Action for Korean Patent Application No. 2011-7009841 (dated Nov. 6, 2015).
Notification of the Reexamination for Chinese Application No. 200980140368.5 (dated Oct. 28, 2015).
Letter Regarding Final Rejection for Japanese Patent Application No. 2011-531127 (dated Oct. 26, 2015).
Certificate of Grant for Australian Patent Application No. 2009282041 (dated Oct. 22, 2015).
Third Office Action for Chinese Patent Application No. 200980157050.8 (dated Oct. 9, 2015).
Notification of European publication No. And information on the application of Article 67(3) EPC for European Patent Application No. 15165149.4 (dated Sep. 30, 2015).
Restriction and/or Election Requirement for U.S. Appl. No. 13/453,707 (dated Sep. 16, 2015).
Office Action for Mexican Patent Application No. 2011003425 (dated Sep. 6, 2015).
Extended European Search Report for European Application No. 15165149.4 (dated Aug. 27, 2015).
Notice of Acceptance for Australian Application No. 2009282041 (dated Jun. 29, 2015).
Notice of Acceptance of Australian Application No. 2009302485 (dated Jun. 2, 2015).
Notification of Decision to Grant or Register for ARIPO Application No. AP/P/2011/005619 (dated Apr. 28, 2015).
Second Office Action for Chinese Patent Application No. 200980157050.8 (dated Apr. 1, 2015).
Decision of Rejection for Chinese Application No. 200980148141.5 (dated Mar. 4, 2015).
Communication pursuant to Article 94(3) EPC for European Application No. 09 819 787.4 (dated Feb. 19, 2015).
Substantive Examination Report for Malaysian Application No. PI 2011001548 (dated Feb. 13, 2015).
Office Action for Japanese Patent Application No. 2011-531127 (dated Feb. 9, 2015).
Decision to Refuse a Patent for Korean Patent Application No. 10-2011-7009841 (dated Aug. 23, 2016).
Patent Examination Report No. 1 for Australian Patent Application No. 2015218423 (dated Jul. 14, 2016).
Office Action for Canadian Patent Application No. 2,734,176 (dated Nov. 29, 2017).
Non-Final Office Action for U.S. Appl. No. 13/453,707 (dated Oct. 2, 2017).
Communication pursuant to Article 94(3) EPC for European Patent Application No. 13 780 892.9 (dated Aug. 31, 2017).
Letter Regarding Decision to Grant for Korean Patent Application No. 10-2016-7026352 (dated Aug. 25, 2017).
Letter regarding Issuance of Certificate of Grant for Malaysian Patent Application No. PL 2011001548 (dated Aug. 15, 2017).
Letter regarding Decision to Grant for Japanese Patent Application No. 2016-031210 (dated Jul. 18, 2017).
Patent Examination Report No. 3 for Australian Patent Application No. 2015218423 (dated Jul. 12, 2017).
Advisory Action for U.S. Appl. No. 13/453,707 (dated Jun. 14, 2017).
Letter Regarding Notice of Decision to Refuse Patent for Korean Application No. 10-2016-7026352 (dated May 18, 2017).
Final Office Action for U.S. Appl. No. 13/453,707 (dated Mar. 31, 2017).
First Office Action for Japanese Patent Application No. 2016-031210 (dated Mar. 27, 2017).
Communication pursuant to Article 94(3) EPC for European Application No. 15 165 149.4 (dated Mar. 22, 2017).
Canadian Office Action for Canadian Application No. 2,734,176 (dated Dec. 21, 2016).
Korean Office Action with Translation for Korean Patent Application No. 10-2016-7026352 (dated Nov. 21, 2016).
Patent Examination Report No. 2 for Australian Patent Application No. 2015218423 (dated Nov. 18, 2016).
Oral Hearing Notice for Indian Patent Application No. 1752/CHENP/2009 (Oct. 13, 2015).
Decision to grant a European patent pursuant to Article 97(1) EPC for European Application No. 07836358.7 (dated Jun. 18, 2015).
Madlmayr et al., "Managing an NFC Ecosystem,"7th International Conference on Mobile Business, pp. 95-101, Jul. 2008).
Office Action for Indian Patent Application Serial No. IN 2686/CHENP/2011 (dated Mar. 15, 2018).
Final Office Action for U.S. Appl. No. 13/453,707 (dated Feb. 23, 2018).
Summons to attend oral proceedings pursuant to Rule 115(1) EPC for European Patent Application No. EP15165149.4 (dated Jan. 19, 2018).
Communication pursuant to Article 94(3) EPC for European Patent Application No. 09 833 865.0 (dated Dec. 11, 2017).
Advisory Action and AFCP 2.0 Decision for U.S. Appl. No. 13/453,707 (dated May 31, 2018).

* cited by examiner

SYSTEMS, METHODS, AND COMPUTER READABLE MEDIA FOR PAYMENT AND NON-PAYMENT VIRTUAL CARD TRANSFER BETWEEN MOBILE DEVICES

PRIORITY CLAIM

This application claims the benefit of U.S. Provisional Patent Application Ser. No. 61/103,083, filed Oct. 6, 2008; the disclosure of which is incorporated herein by reference in its entirety.

TECHNICAL FIELD

The subject matter described herein relates to virtual card transfer. More particularly, the subject matter described herein relates to payment and non-payment virtual card transfer between mobile devices.

BACKGROUND

At present, no method or process has been defined for virtual card transfer between NFC-enabled mobile devices that includes both monetary and non-monetary values such as debit, credit, rewards or loyalty points, coupons, business or personal information. Instead, various methods exist for transferring money between individuals that include transferring monetary amounts between various types of bank or credit accounts associated each individual.

Accordingly, there exists a need for a system, method, and computer product for virtual card transfer between NFC-enabled mobile devices.

SUMMARY

The subject matter described herein includes methods, systems, and computer readable media for virtual card transfer between NFC-enabled mobile devices. According to one aspect, a method for over-the-air (OTA) virtual card transfer between NFC-enabled mobile devices is disclosed. The method includes receiving, at an OTA provisioning server, a virtual card from a sending mobile device intended for a receiving mobile device. The virtual card is provisioned in the receiving mobile device, where the virtual card is immediately usable by the receiving mobile device at a point of sale terminal.

According to another aspect, the subject matter includes an over-the-air (OTA) server for providing virtual card transfer between near field communications (NFC)-enabled mobile devices. The OTA provisioning server includes a receiving module for receiving, from a sending mobile device, virtual card intended for a receiving mobile device. An account module provisions the virtual card on the receiving mobile device, where the virtual card is immediately usable by the receiving mobile device at a point of sale terminal.

According to another aspect, the subject matter includes an acceptance and issuance server. The acceptance and issuance server device includes a first module being communicatively coupled to a contactless payment interface, where the contactless payment interface is configured to communicate with a near field communications (NFC)-enabled mobile device, over the air, for retrieving virtual card information from a secure element on the mobile device associated with a proposed virtual card transaction. A second module is communicatively coupled to a financial institution for communicating the virtual card information to the financial institution. The second module verifies and authorizes the proposed transaction based o the virtual card information and completes the transaction using the virtual card. In some embodiments, the second module may be configured to generate a secondary virtual card to be transferred to second, third, etc. receivers.

As used herein, the term "mobile device," "NFC enabled mobile device," "smart phone," and "mobile handset" refer to any mobile device that is enabled with embedded or add-on capability, a secure element (e.g., a cryptographically protected smart chip), a radio frequency communications interface (e.g., contactless or NFC), and an antenna. The mobile device may comprise a mobile phone with embedded NFC support circuitry/software, which enables a user to wirelessly communicate with a contactless and/or wireless device reader. Similarly, an NFC enabled device may include external memory-based or processor-based circuitry/software which enables a user to wirelessly communicate with contactless and/or wireless device reader. The secure element may be embedded in the mobile device, located in a SIM/USIM module, an add-on device (e.g., MicroSD card), SIM card, or processor card), or any other plug in device. The plug in device may come with antenna or utilize inbuilt phone antenna.

As used herein, the term "wallet application" refers to a software application including computer executable instructions stored in a computer readable medium, such as random access memory (RAM), flash memory or external memory that may be executed by a processor in a mobile device, where the wallet application stores information associated with one or more virtual cards. The wallet application runs on NFC-enabled mobile phones, enabling multiple payment-related and non-payment related applications managing secure data and allowing secure contactless payment. The wallet application provides the interface for provisioning data to the mobile device, as well as transmitting payment and non-payment related card or coupon information directly to POS terminals equipped with a contactless/wireless reader. A wallet application may manage multiple virtual cards stored on a mobile device. The wallet application may also be configured to ensure end-to-end protection of virtual card data and payment and non-payment related applications with its interface for OTA provisioning as well as its management of the mobile device's secure element. The secure element may include any type of hardware or combination of hardware and software that utilizes encryption or similar means for securing designated data within a mobile device.

As used herein, the term "Acceptance and issuance server" refers to a software application including computer executable instructions stored in a computer readable medium, such as random access memory (RAM) or flash memory, that may be executed by a processor in a point of sale device and/or general purpose computer system, where the acceptance and issuance server is a back-end system that indirectly supports front-end services. While front-end services are services (e.g., applications, devices, etc.) that users interact with directly and, therefore, are often located closer to a required resource and/or have the capability to communicate with the required resource (e.g., communicate via NFC with a customer's mobile device), a back-end application may interact directly with the front-end or, perhaps more typically, is a program called from an intermediate program that mediates front-end and back-end activities in order to support the front end. The acceptance and issuance server is used for authorization of card accounts, payment and non-payment card authorization, ACH processing, account validation, transaction amount processing, and loyalty, coupon or promotion processing by utilizing the contactless interface command to read account information from handset by sending the command over the air.

As used herein, the term "OTA infrastructure software" refers to software including computer executable instructions stored in a computer readable medium, such as random access memory (RAM) or flash memory, that may be executed by a processor in an OTA provisioning server or similar computing platform, where the OTA infrastructure software enables over the air provisioning of virtual cards to wallet applications.

As used herein, the term "card" refers to a physical card, typically a magnetic stripe card, that may be drawn on an associated payment or non-payment card account. Because the person creating or issuing the card must transfer the information associated with the card, that information is immediately available to the recipient/owner/user of the card subject to various restrictions (See closed loop and open loop cards below).

As used herein, the term "virtual card account" refers to an account associated with a virtual card.

As used herein, the term "virtual card" refers to an electronic, non-physical representation of a card. A virtual card may be with or without electronic value. Virtual cards may represent credit cards, debit cards, prepaid cards, gift cards, loyalty cards, rewards card, coupon or promotion, business cards, health cards, membership cards, and other similar representations of payment and non-payment cards.

As used herein, the term "ACH" refers to Automated Clearing House Inc., a full service payment processing company offering ecommerce solutions for businesses. The ACH Network is a nationwide batch-oriented electronic funds transfer system governed by the National ACH Association (NACHA) which provides for the interbank clearing of electronic payments for participating depository financial institutions. The Federal Reserve and Electronic Payments Network act as ACH Operators, central clearing facilities through which financial institutions transmit or receive ACH entries. Exemplary types of ACH payments include: direct payroll deposit, Social Security and other government benefits, tax refunds, direct payment of consumer bills (e.g., mortgages, loans, utility bills and insurance premiums), business-to-business payments, E-checks, E-commerce payments, and federal, state and local tax payments.

As used herein, the term "value" refers to the worth of an asset, business entity, good, service, liability, or obligation. Value can be expressed in monetary terms (e.g., dollars) or in non-monetary terms. For example, a value may include an amount, (loyalty) points, rewards, coupons, personal information, or promotion values.

As used herein, the term "presentable" may refer to the characteristic of capable of being given, displayed, or offered. For example, a mobile device may be presentable to a POS terminal in order to communicate via NFC in order to retrieve information from the mobile device. The term presentable intended to have a meaning broader in scope than associated with being solely for the purpose of conducting a payment transaction, as the information presented may include anything of value associated with a virtual card. As mentioned above, this may include non-monetary information such as coupons, loyalty points, and personal information.

The subject matter described herein for virtual card between mobile devices may be implemented using a computer readable medium having stored thereon computer executable instructions that when executed by the processor of a computer control the computer to perform steps of the aforementioned method (see above). Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for virtual card transfer between mobile devices described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

In accordance with the subject matter disclosed herein, systems, methods, and computer readable media are provided for transferring a virtual card between NFC-enabled mobile devices.

Figure 1:
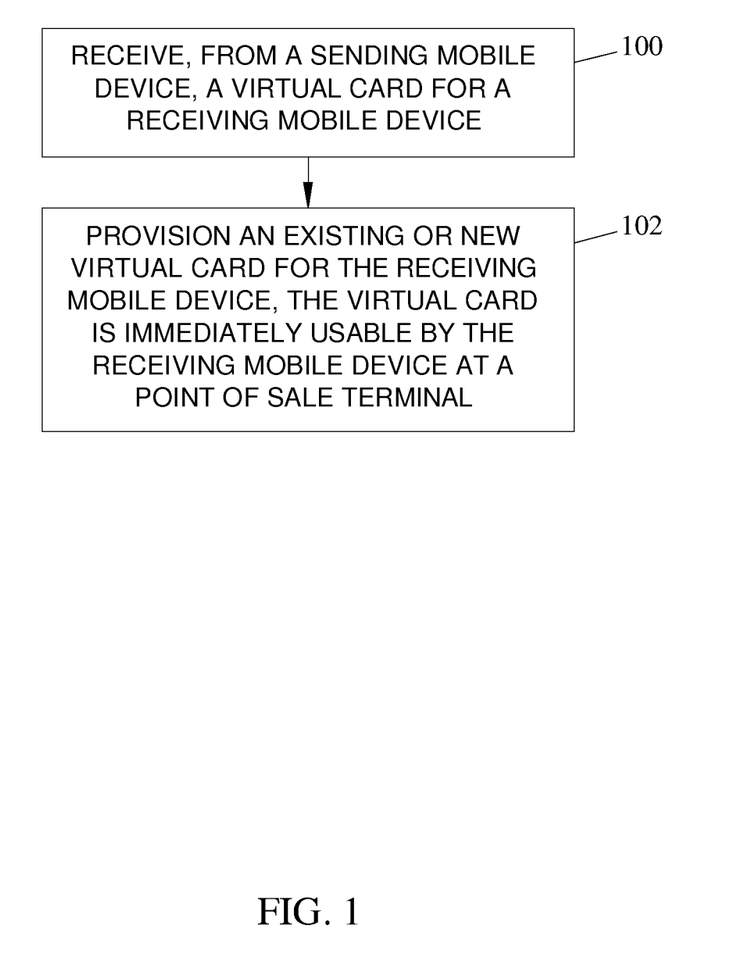
FIG. 1 is a flowchart illustrating exemplary steps for performing a virtual card transfer between mobile devices using a virtual card according to an embodiment of the subject matter described herein.

FIG. 1 is a flowchart illustrating exemplary steps for performing a virtual card transfer between mobile devices according to an embodiment of the subject matter described herein. Referring to FIG. 1, in step 100, a virtual card is received from a sending mobile device for a receiving mobile device.

In step 102, a new or existing virtual card is provisioned for the receiving mobile device, where the virtual card is immediately usable by the receiving mobile device at a point of sale terminal.

Figure 2:
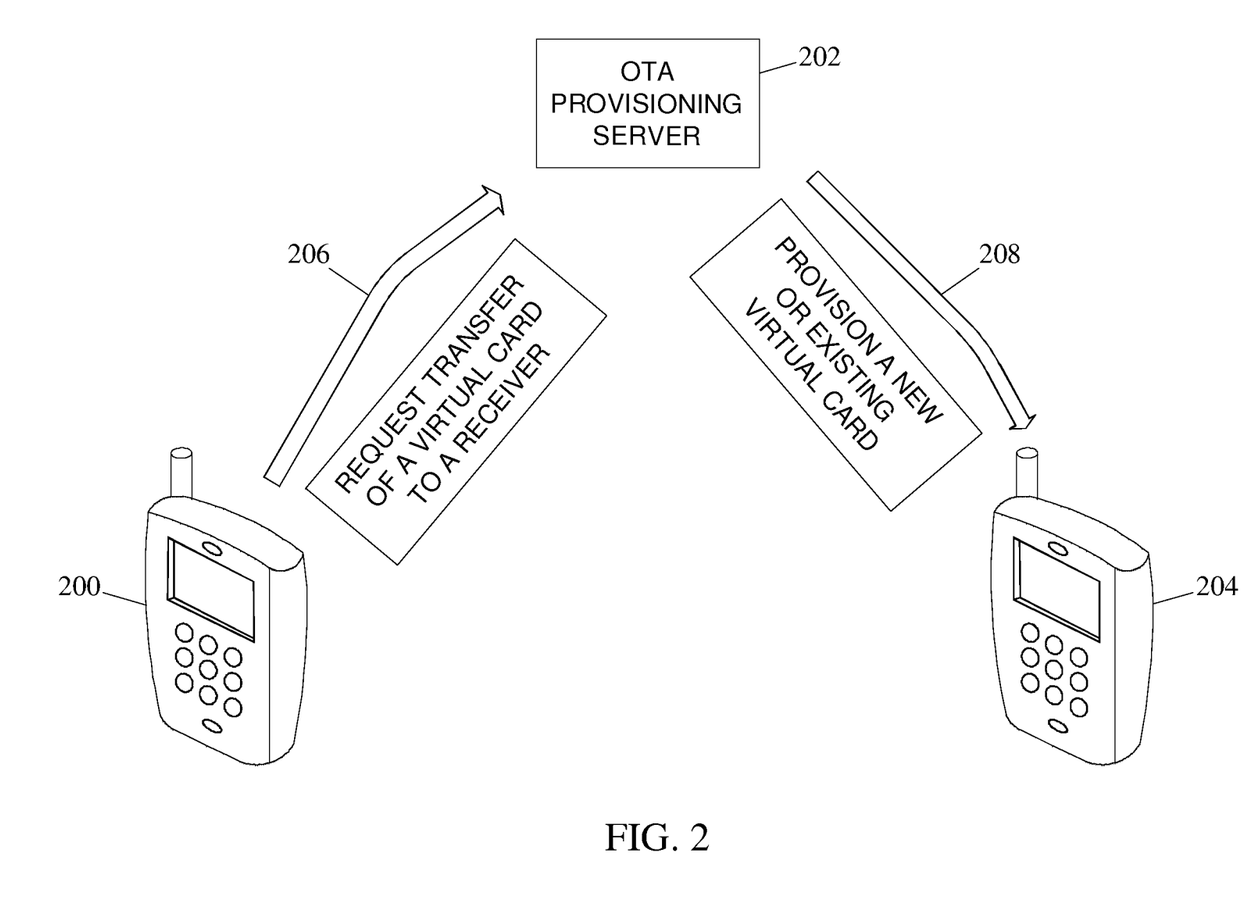
FIG. 2 is a diagram illustrating an exemplary system for transferring a virtual card between a sender and a receiver according to an embodiment of the subject matter described herein.

FIG. 2 is a diagram illustrating an exemplary system for transferring virtual card between a sender and a receiver according to an embodiment of the subject matter described herein. Referring to FIG. 2, the system may include first mobile device 200 (hereinafter, "sender"), over the air (OTA) provisioning server 202, and second mobile device 204 (hereinafter, "receiver"). Mobile devices 200 and 204 may include near field communications (NFC)-enabled or non-NFC enabled mobile devices.

As described above, an NFC enabled mobile device may comprise a mobile phone with embedded NFC support circuitry/software, which enables a user to wirelessly communicate with wireless device reader. Similarly, an NFC enabled device may include external memory-based or processor-based circuitry/software which enables a user to wirelessly communicate with contactless/wireless device reader. Similarly, an NFC enabled mobile device may include universal subscriber identification module (USIM)/USIM integrated circuit card (UICC) NFC support circuitry/software to wirelessly communicate with the contactless/wireless device reader. For example, a POS terminal may include a contactless/wireless device reader capable of communicating with NFC-enabled mobile devices, contactless/wireless smart cards, or other contactless payment devices via a short range electromagnetic field. One type of communications channel that may be used between a device capable of supporting a virtual/soft card and a wireless device reader for payment/coupon transactions is near field communications (NFC). Near field communications typically occur at a distance of within about one wavelength of the communications frequency being used between the mobile device and the wireless device reader. An example of a contactless communications protocol that may be used in communications between a device capable of supporting a softcard and a wireless device reader is an ISO 14443 interface.

Non-NFC enabled mobile devices may include a cellular phone or other mobile device that does not include embedded NFC, external memory based NFC or USIM/UICC NFC support circuitry/software or any other means to wirelessly communicate with a POS terminal.

Additionally, mobile devices may be capable of data communications with remote entities via an OTA provisioning process. For example, devices with wireless communications capabilities may implement HTTP over TCP/IP or UDP, SMS PP, CAT_TP over-the-air interface for communicating with remote entities. The over the air interface protocol used by a device with wireless communications capabilities may vary with the device. Examples of air interface protocols that may be used include GSM, GPRS, CDMA, EDGE, 3G, Bluetooth, WIFI, WIMAX, LAN, Ethernet, etc.

Returning to FIG. 2, sender 200 may transmit a request to transfer a virtual card to OTA provisioning server 202. For example, request 206 may request transfer of a virtual card having some value (e.g., $20) to receiver 204. In response to receiving request 206, OTA provisioning server 202 may provision a new virtual card for receiver 204. For example, OTA provisioning server 202 may provision $20 virtual card via message(s) 208. Upon receiving virtual card 208, receiver 204 may immediately use the virtual card, either to spend at a corresponding open or closed loop merchant POS terminal, or for transferring to an existing account associated with receiver 204.

Figure 3A:
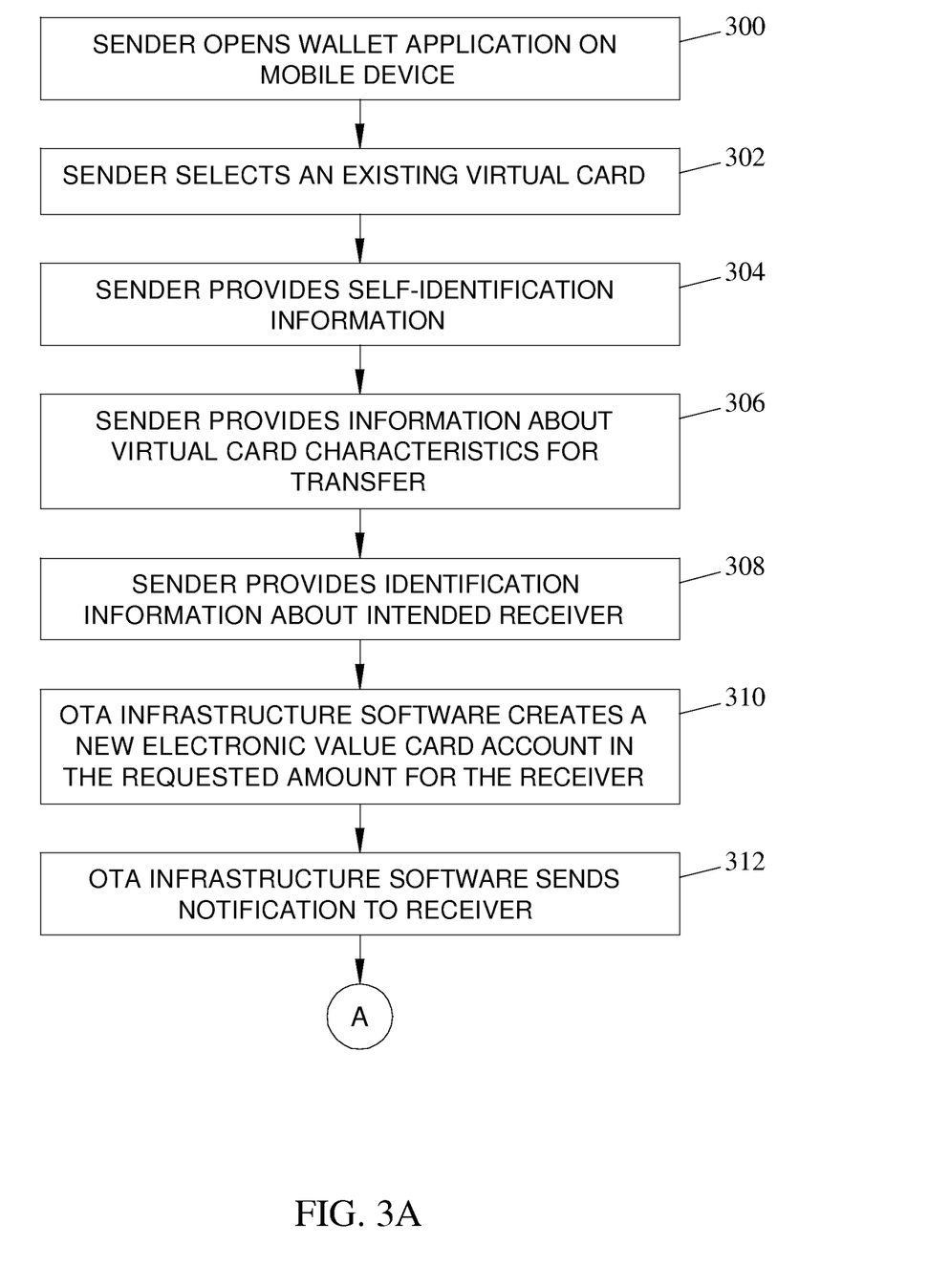
FIGS. 3A and 3B are a flowchart illustrating exemplary steps for transferring a virtual card between a sender and a receiver according to an embodiment of the subject matter described herein.
Figure 3B:
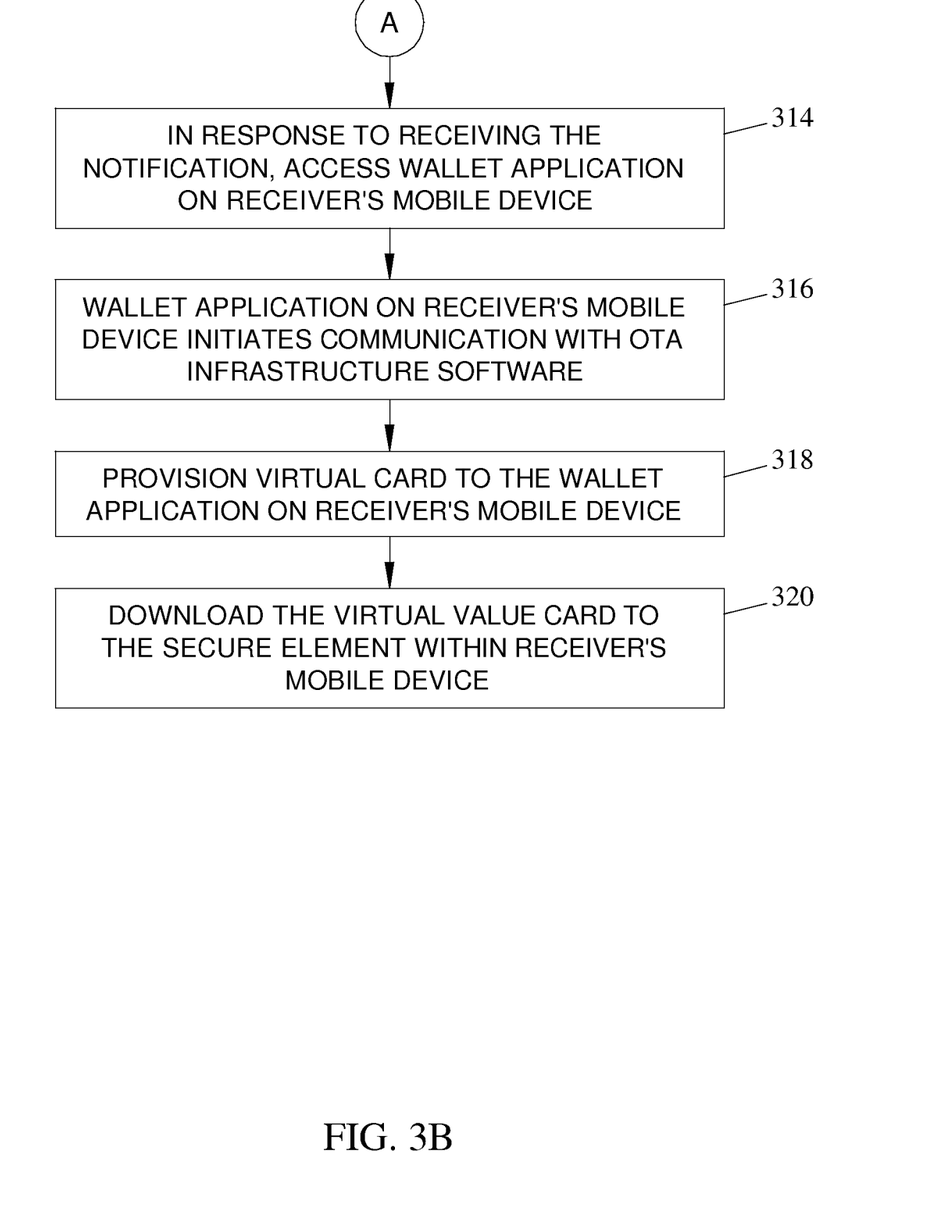

FIG. 3 is a flowchart illustrating exemplary steps for transferring a virtual card between a sender and a receiver according to an embodiment of the subject matter described herein. Referring to FIG. 3, at step 300 the sender opens the wallet application on his or her mobile device. For example, the sender may utilize an interface on the mobile device (e.g., keypad or touch screen) for selecting the wallet application from among a selection of available programs and interacting with the wallet application in order to provide various information described below.

In step 302, the sender may select an existing account used for funding the value transfer (i.e., the source). For example, sender 200 may enter or otherwise select track I and/or II data, routing number, bank account number, or ACH identifier associated with an account sender 200 wishes to use.

In step 304, the sender may provide identification information about him or herself. For example, sender 200 may provide his or her name, address, phone number, email address, and/or password in order to uniquely identify him or herself as the sender of the virtual card.

In step 306, the sender may provide information regarding the desired virtual card characteristics. For example, sender 200 may enter an amount to be transferred (e.g., $20) and whether the virtual card is closed loop or open loop. This may include specifying that the virtual card may only be used at Target™ stores (i.e., closed loop) or may be used anywhere Visa™ is accepted (i.e., open loop).

In step 308, the sender may provide identification information about the intended recipient of the funds (i.e., the receiver). For example, sender 200 may provide the name, address, phone number, email address, or other information (e.g., a challenge question) that may be used to uniquely identify receiver 204 as the intended recipient of the virtual card.

In step 310, the sender may confirm the virtual card authorization. For example, sender 200 may optionally be presented with transaction fees or other final details about the transaction, and sender 200 may accept these final conditions and initiate the value transfer.

In step 312, OTA software application may create a new virtual card account with the requested information designating the receiver as the intended recipient using the identification information provided by the sender in step 304. For example, the virtual card account may be either a closed loop or an open loop virtual card account. An open loop virtual card account is a virtual card account that is acceptable at multiple vendors that have a merchant agreement with the virtual card account issuer. Typically, open loop cards are branded with the identity of the card issuer, where the card issuer is a large, multi-national banking or credit institution. Examples of open loop cards include prepaid or gift cards branded with/issued by VISA™, MasterCard™, AMEX™, or Discover™ and are acceptable at any location maintaining a merchant account with one or more of those companies. A closed loop virtual card account is a virtual card account that is only accepted at the store or retail locations of the card issuer. Examples of closed loop virtual cards include prepaid/gift cards issued by Belk's™ Department store, BestBuy™, or HomeDepot™, which may only be redeemed at each of these locations, respectively.

For example, a loyalty card account may be a closed loop loyalty card account such as a Safeway™ loyalty account, Macy's™ loyalty account, or a United Loyalty™ account. Loyalty reward data may include loyalty points that are accumulated via purchases a customer makes with the associated merchant. Various rewards such as discounts, announcements, early offers for sale and the like may be exchanged for loyalty points or provided to customers with a threshold number of loyalty points in their account. For example, a coupon or promotion for a specific retailer or merchant and/or for a specific product may be an item of value that can be transferred electronically between mobile devices according to the subject matter described herein. Thus, sender 200 may have a coupon for $20 off of any TV for sale at BestBuy™ which may be transferred to receiver 204 such that receiver 204 may immediately redeem the coupon for a $20 discount on a TV purchase at a BestBuy™ location.

For example, OTA provisioning server 202 may send a control/binary SMS (cSMS) or bearer independent protocol (BIP) channel initiation or SMS point-to-point (PP) message to receiver 204. For example, the request message may be embodied as a message requesting that OTA provisioning server 202 issue a virtual card to the recipient mobile device number provided. Upon receiving the recipient data, OTA provisioning server 202 may be configured to determine if the recipient mobile device is NFC enabled. In one embodiment, OTA provisioning server 202 may access a database to obtain information relating to the type of mobile device (e.g., NFC enabled or otherwise) that is associated with the provided recipient number.

After receiving the mobile device type information (and virtual card information), OTA provisioning server 202 may deliver the virtual card to receiver 204. The manner in which the virtual card may be sent depends if the recipient is an NFC enabled phone or non-NFC enabled phone. In the former case, OTA provisioning server 202 may be configured to deliver the virtual card. In one embodiment, the provisioning of a virtual card over the air interface may occur over wireless connection, for example, using HTTP and TCP protocols, SMS and CAT_TP using BIP protocol. A TCP socket may be created for the provisioning connection. The physical layer of the connection may utilize, CDMA, Bluetooth, GPRS, GSM, Wi-Fi, Wi-Max, Ethernet or LAN air interface protocols. Provisioning may occur over the Internet or over a corporate or other intranet or utilizing TCP/IP, SMS PP, CAT_TP, UDP. Provisioning may occur automatically by providing a provisioning application on a mobile device that establishes a connection with a provisioning configuration server (e.g., OTA provisioning server 202) in response to being started or the provisioning configuration server may start the provisioning using control/binary SMS without using provisioning application on a mobile device.

Alternatively, if the receiver is a non-NFC enabled phone, then OTA provisioning server 202 may deliver the virtual card as an authorization code or a URL via an SMS message.

In the exemplary embodiment where the receiving mobile device is NFC enabled, OTA provisioning server 202 may sends a control SMS message or initiate a BIP channel using SMS PP or SMSM PP to NFC enabled mobile device 204. In response, NFC enabled mobile device 204 may read the SMS control content, which may triggers a midlet application (e.g., a wallet client application) that initiates a downloading process to receive a virtual card from OTA provisioning server 202 or open BIP channel to receive a virtual card from OAT provisioning server 202. NFC enabled mobile device 204 (e.g., via the wallet client) may then reply to OTA provisioning server 202 with an acknowledgement message.

In step 314, the receiver may then receive an indication of the virtual card provisioning and that the wallet application on the mobile device is accessed. Receiver 204 may also optionally receive a notification message from OTA infrastructure software indicating that a virtual card was available for provisioning. For example, this may include presenting receiver 204 with a message on his mobile device (e.g., "Happy Birthday John") that may indicate the reason for the money transfer.

In step 316, the wallet application may ask the receiver to initiate the virtual card download process. For example, by clicking on a link associated with or included in the optional message, receiver 204 may access wallet application for conforming reception of the virtual card. In this way, receiver 204 may accept or deny virtual card transfers in the event that the virtual card is unsolicited (e.g., spam) or receiver 204 is not the correct intended receiver (e.g., delivery error such as transposed telephone number digits or typo in email address provided by sender 200.)

In step 318, the wallet application may initiate communication with the OTA infrastructure software. For example, the wallet application may request a secure communication channel with OTA provisioning server 202 that may include a communications handshake procedure between the wallet application and OTA provisioning server 202 that may conclude with the transmission of an acknowledgement message by the wallet application to OTA provisioning server 202. In response to receiving the acknowledgement message, OTA provisioning server 202 may establish a secure connection with NFC enabled mobile device 204 and provide identification data. In one embodiment, identification data includes data that is unique to the recipient of the virtual card. In an alternate embodiment, the present subject matter may forego establishing a secure connection and the virtual card may be transmitted over an unsecured connection and stored in the mobile device's general memory.

In step 318, OTA software infrastructure may start the virtual card provisioning process to the wallet application. For example, OTA provisioning server may send cSMS or initiate the BIP channel to receiver's handset to initiate the download process. Once wallet is initiated or BIP channel established, OTA provisioning server create a secure channel to provision the virtual value card with account identification with or without value, branding image, welcome message and other data.

In step 320, the provisioning process may be completed and the virtual card may be successfully downloaded to a secure element within the receiver's mobile device. The downloaded virtual card will have the requested account information available for immediate use by the receiver. For example, after receiving a $20 closed loop Target™ virtual card, receiver 204 may present the card by placing his or her NFC enabled mobile device in proximity to a contactless/wireless reader associated with a POS terminal. The contactless/wireless reader may read information from the secure element on the mobile device and deduct the amount of the desired purchase from the virtual card. The virtual card may then be reused at a Target™ location for a future use.

After the download process is completed, the wallet client may display the virtual card. After the virtual card is stored in NFC enabled mobile device 204, the recipient may decide to use the virtual card at an appropriate retail store or the like. For instance, after deciding to purchase a particular good at a store, the recipient may bring the merchandise to the checkout register station and be prompted by the cashier to provide a method of payment. The recipient may then use mobile device 204 to select the coupon virtual/soft card to be used in the payment transaction. For example, the recipient may interface mobile device 204 with a wireless device reader via NFC communication. In one embodiment, the virtual card transaction may also be coupled with a conventional payment transaction. For example, is the virtual card is sufficient to cover the selected good(s), no other method of payment would be required. Otherwise the customer may be prompted to provide additional payment for the outstanding balance.

If a second embodiment, the virtual card may be provided to a non-NFC enabled phone via one or more SMS messages. For example, mobile device 204 may receive an SMS message from OTA provisioning server 202 instead of receiving an SMS control message. The received SMS message may include a virtual card code. In one embodiment, the virtual card code may be associated with a designated amount that may be provided to a cashier at POS terminal. In an alternate embodiment, the SMS message may instead include a URL that is linked to a barcode image.

After receiving the virtual card, the user of mobile device 204 may decide to use the virtual card at a retail store or the like. For example, after selecting goods for purchase, the user presents the merchandise at the checkout counter and may be prompted by the cashier to provide a method of payment. The user may then provide the virtual card code to the cashier. The cashier may then enter the virtual card code in the POS terminal. In one embodiment, the POS terminal may validate the virtual card code with a merchant server to ensure that the virtual card is still valid or alternatively, that the virtual card value is sufficient to cover the transaction. The merchant server may return an acknowledgement message if the coupon code is valid. It is also appreciated that the receiver may use the received funds either by transferring it to an existing account associated with the receiver, or may re-transfer the money to a third person as a second virtual card. In the latter case, the receiver may become the sender for purposes of the second value transfer transaction, and a third party may become the receiver.

Figure 4:
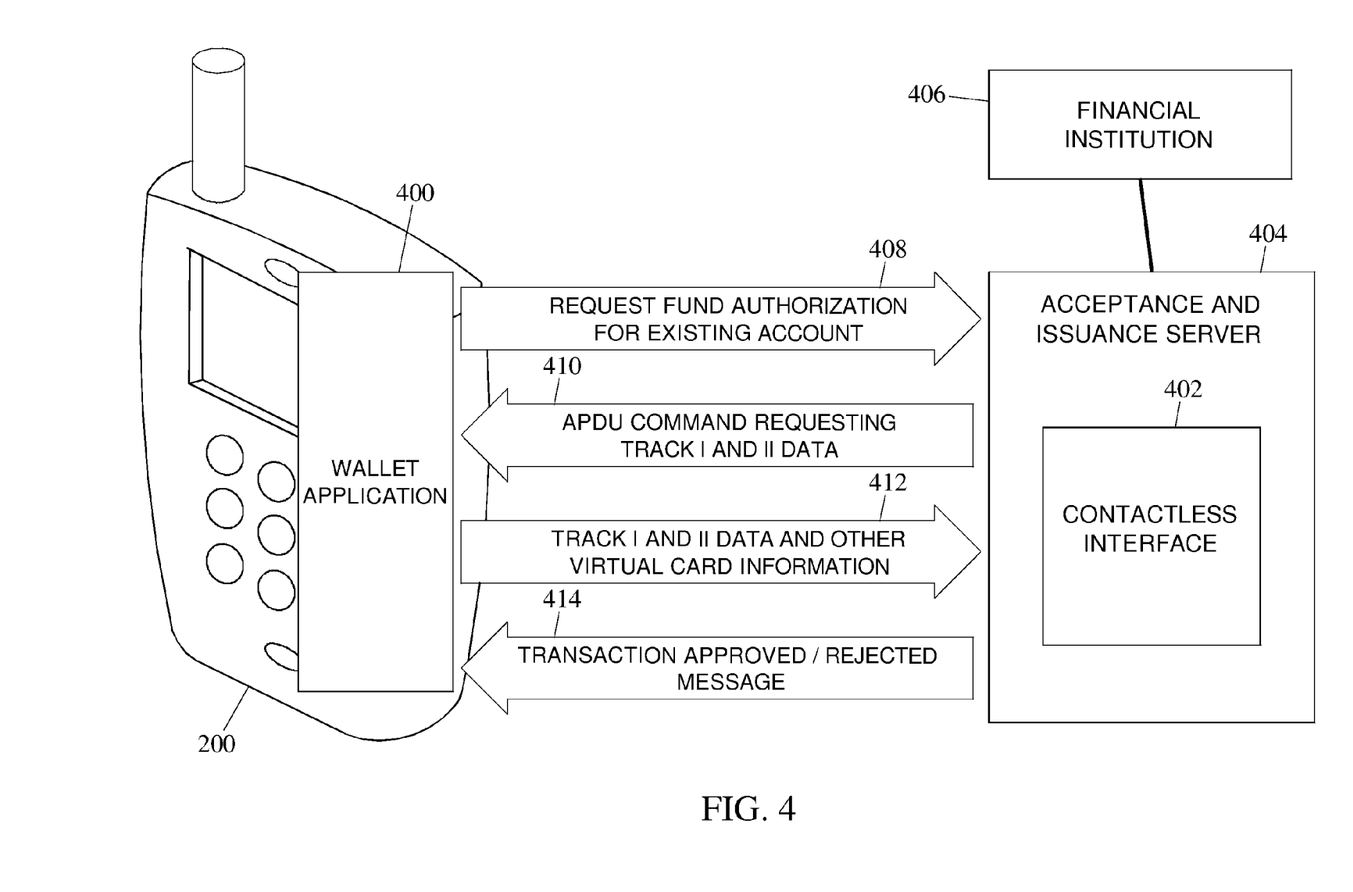
FIG. 4 is a diagram illustrating an exemplary system for authorizing a virtual card from an existing account of the sender according to an embodiment of the subject matter described herein.

FIG. 4 is a diagram illustrating an exemplary system for authorizing value from an existing account of the sender according to an embodiment of the subject matter described herein. Referring to FIG. 4, wallet application 400 may be located on mobile device 200 and configured to communicate with contactless interface 402 which is associated with acceptance and issuance server 404. Additionally, as will be described in greater detail below, acceptance and issuance server 404 may include a back-end server that may communicate electronically with one or more financial institutions 406. In the exemplary message exchange shown, wallet application 400 may transmit request 408 for authorizing values for an existing account. In response to receiving request 408, acceptance and issuance server 404 may return APDU command 410 requesting Track I and II (or similar) data from the secure element (not shown) securely. Wallet application 400 may provide track I and II data and a transaction amount included in message(s) 412. Lastly, after verification/authorization, acceptance and issuance server 404 may return a transaction approval or rejection message 414.

Unlike a non-acceptance and issuance server system that requires integration with one or more terminals, acceptance and issuance server 404 may run on a general use computing platform, such as a personal computer. To process transactions, merchants may swipe a credit card through an attached credit card reader or accept contactless payment through an attached contactless payment reader.

Figure 5:
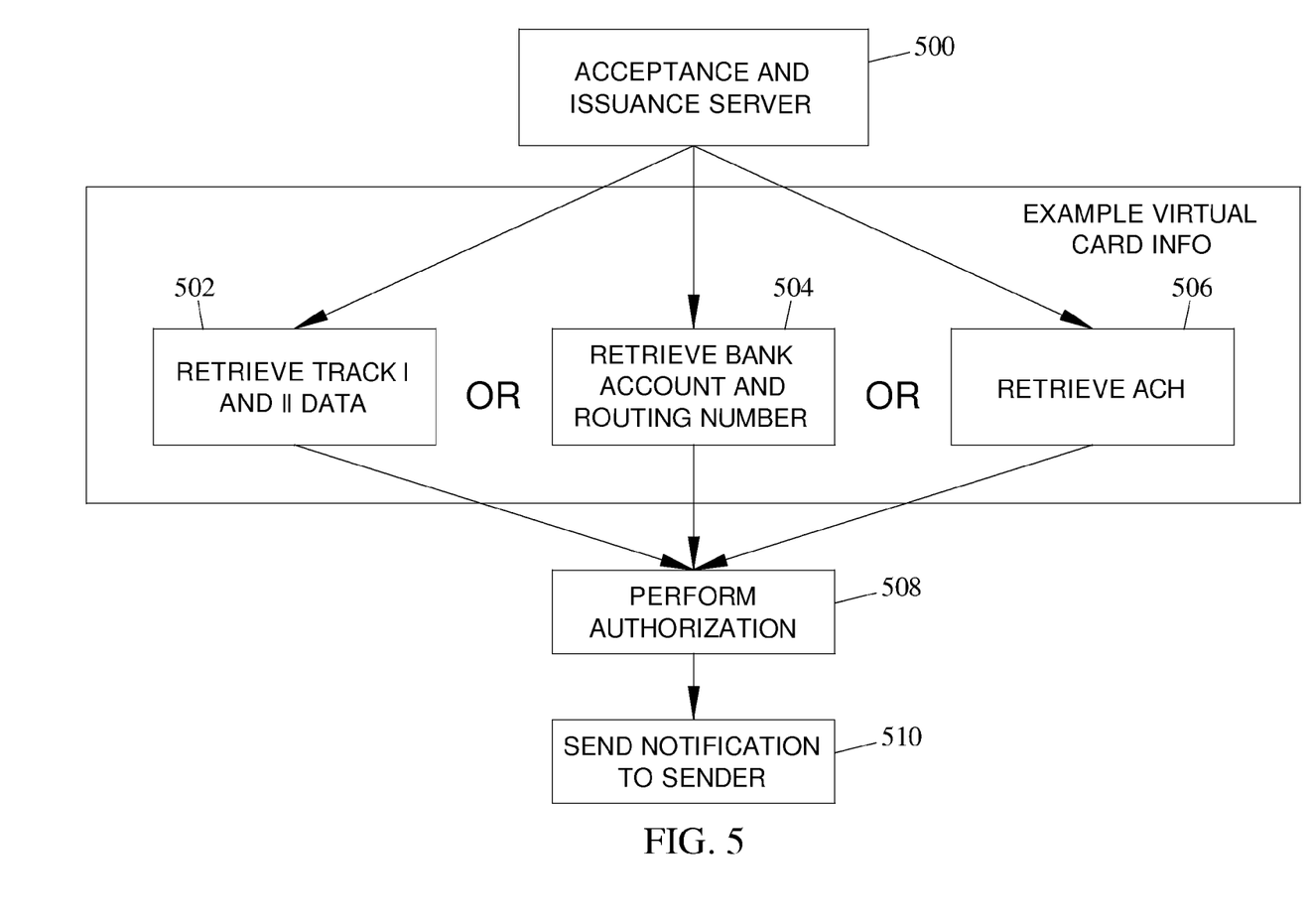
FIG. 5 is a flowchart illustrating exemplary steps for authorizing a virtual card from an existing account of the sender according to an embodiment of the subject matter described herein.

FIG. 5 is a flowchart illustrating exemplary steps for authorizing a virtual card of the sender. Referring to FIG. 5, in step 500, the wallet application may connect to Hosted point of sale (POS) in order to validate the virtual card information to be transferred.

In step 502, the Acceptance and issuance server may send instructions to the wallet application to retrieve virtual card information. For example, Acceptance and issuance server 404 may send one or more application protocol data unit (APDU) commands 406 to wallet application 400 requesting Track I, Track II data, code for the virtual card account information. Alternatively, Acceptance and issuance server 404 may send one or more APDU commands 410 to wallet application 400 requesting a routing number, bank information, account number, or automated clearing house (ACH) network identifier.

In step 508, the Acceptance and issuance server may use the information/credentials provided in steps 502-506 to request validation of the virtual card and the sender's identity.

If the transaction is approved, in step 510, the acceptance and issuance server may complete the transaction and send a confirmation message to the sender's mobile device.

Figure 6:
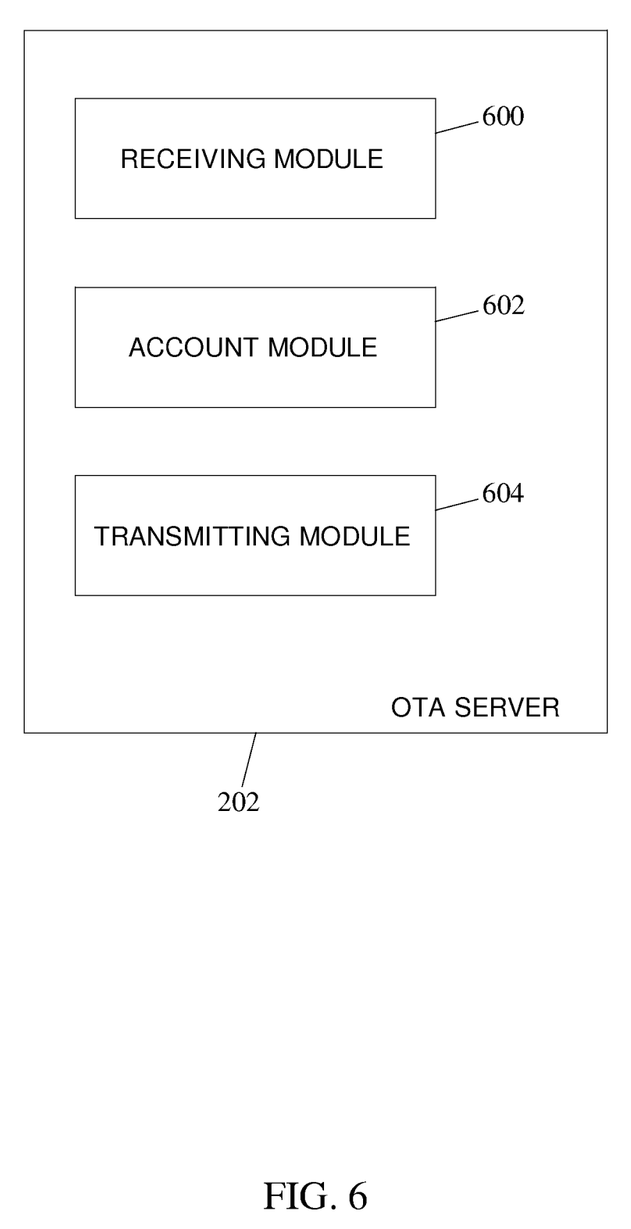
FIG. 6 is a functional block diagram of exemplary components of a mobile device suitable for performing a virtual card transfer between mobile devices according to an embodiment of the subject matter described herein.

FIG. 6 is a functional block diagram of exemplary components of a mobile device suitable for performing an electronic money transfer between mobile devices using a virtual card according to an embodiment of the subject matter described herein. Referring to FIG. 6, OTA provisioning server 202 may include receiving module 600, account module 602, and transmitting module 604. Receiving module 600 may be configured to receive, from a sending mobile device, an electronic, monetary deposit for a predetermined amount intended for a receiving mobile device. Account module 602 may be configured to provision an electronic, monetary account in the predetermined amount. Transmitting module 604 may be configured to transmit the electronic, monetary deposit in the predetermined amount to the receiving mobile device, wherein the deposit is immediately usable by the receiving mobile device at a point of sale terminal.

Figure 7:
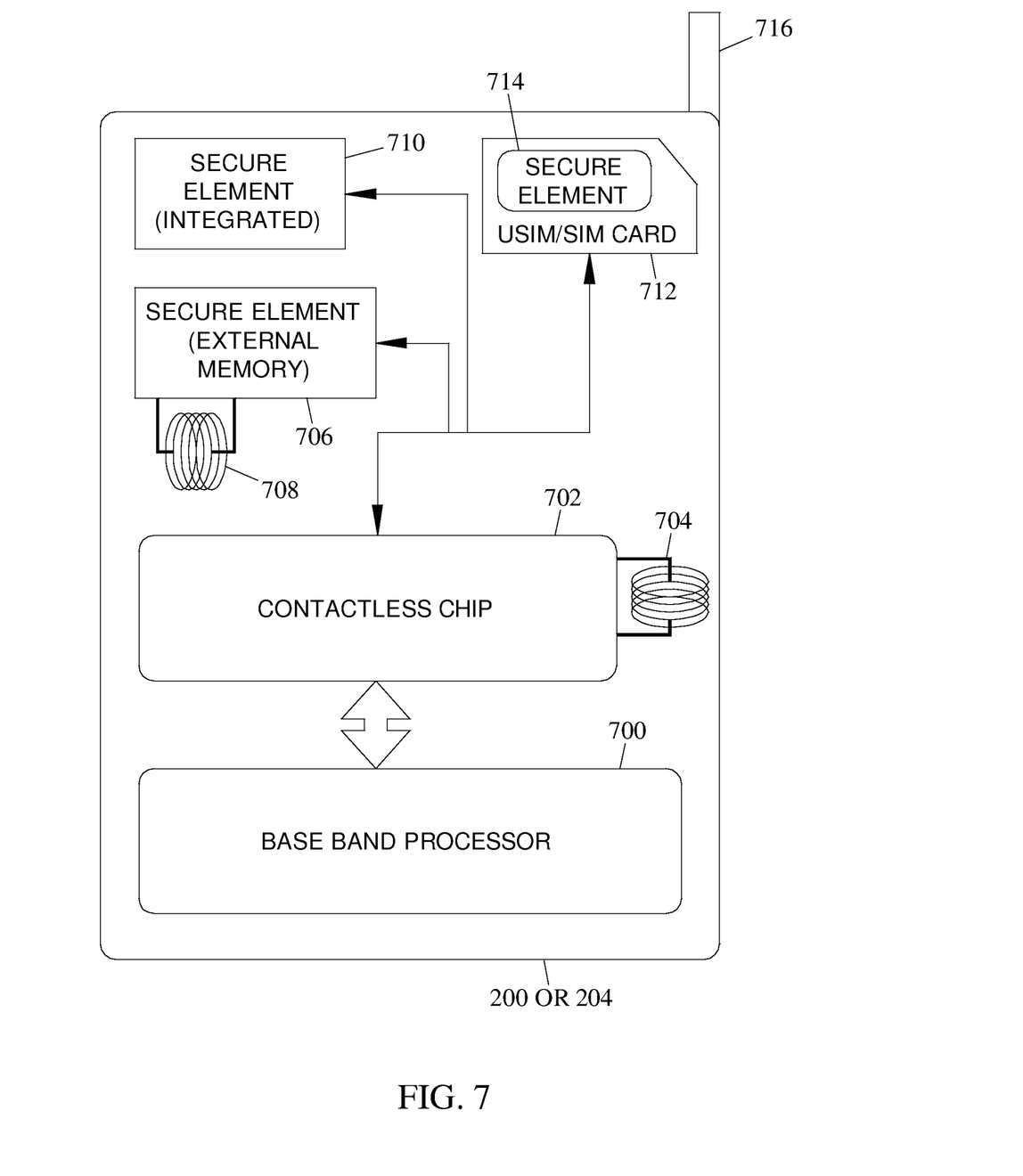
FIG. 7 is a functional block diagram illustrating exemplary internal components of a NFC enabled mobile device suitable for performing a virtual card transfer between mobile devices according to an embodiment of the subject matter described herein.

FIG. 7 is a functional block diagram illustrating exemplary internal components of a NFC enabled mobile device suitable for performing a virtual card transfer between mobile devices according to an embodiment of the subject matter described herein. Referring to FIG. 7, mobile device 200/204 may include a baseband processor 700, contactless chip 702, integrated antenna 704, secure element (external memory) 706, integrated antenna 708, secure element (integrated) 710, USIM/SIM card 712, secure element (within USIM/SIM card 712) 714, and phone antenna 716. It is appreciated that the NFC components shown in FIG. 7 may be embedded in circuitry within mobile handset 200/204, integrated with SIM module, integrated with external memory, associated with phone memory, associated with external memory directly, or any other type for form factor which enables the handheld device to act as an NFC enabled handset. It is further appreciated that mobile device 200/204 may include various different form factors for secure element(s) 708, 710, and 714 without departing from the scope of the subject matter described herein. For example, secure element(s) 708, 710, and 714 may be present in combination or as a single instance (not shown).

Baseband processor (BP) 700 may include a processor that implements a wireless communications stack, such as the global system for mobile communications (GSM) stack. It may be appreciated that most smart phones, such as mobile device 200/204, may contain two processors. The operating system (OS), user interface, and applications may run on an application processor (AP), such as an ARM-based CPU, while phone radio communications and control software may be run on BP 700. The AP may communicate with BP 700 over a defined control link, such as a serial connection or general purpose input/output (GPIO) lines between BP 700 and the AP. One reason for separating locating the radio functionality at BP 700 may be to protect highly timing dependent functions, such as radio control functions (e.g., signal modulation, encoding, radio frequency shifting, etc.) from less timing dependent functions. Another benefit of utilizing a BP includes that once the BP is designed and certified, it is assured to function properly regardless of application and OS changes (e.g., OS, application, and driver errors will not cause malfunctions in the phone radio).

Contactless chip 702 may be associated with integrated antenna 704 for communicating with contactless devices such as contactless payment readers or other NFC enabled mobile phones. Secure element 706 may be located in external memory (e.g., microSD or external memory) and may be device associated with integrated antenna 708. Alternately, secure element 706 may utilize phone antenna 716. Secure element 710 may be integrated with phone circuitry and utilize phone antenna 716 for communicating with external devices. USIM/SIM card 712 may include secure element 714 and may be integrated with phone antenna 716 for communicating wirelessly with external devices. This may include OTA provisioning server 202 via any suitable non-NFC communications protocol mentioned above. USIM 712 is an application for universal mobile telecommunications system (UMTS) mobile telephony running on a universal integrated circuit card (UICC) smart card inserted in mobile phone. It is appreciated that USIM 712 is a logical entity located on a physical UICC card, and not the physical card itself. For example, the UICC card may include physical hardware elements such as a processor, read only memory (ROM), random access memory (RAM), electronically erasable programmable read only memory (EEPROM), and input/output (I/O) circuits.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for over-the-air (OTA) virtual card transfer between near field communications (NFC)-enabled mobile devices, the method comprising:
   at an OTA provisioning server comprising at least one computer having associated hardware:
      receiving, from a sending mobile device operated by a sender, data for provisioning a virtual card to a receiving mobile device, the data including a virtual card type selected by the sender from a plurality of virtual card types and a receiver for the virtual card, and a recipient mobile device number corresponding to the receiving mobile device, wherein each of the sending mobile device and the receiving mobile device includes an NFC-enabled mobile phone device;
      accessing a database using the recipient mobile device number to obtain mobile device type information related to the receiving mobile device; and
      in response to determining that the mobile device type information indicates that the receiving mobile device is an NFC enabled mobile device, provisioning the virtual card to the receiving mobile device via an OTA interface, wherein provisioning the virtual card includes sending a control message from the OTA provisioning server to the receiving mobile device that triggers a wallet application in the receiving mobile device to initiate downloading of the virtual card from the OTA provisioning server to the receiving mobile device, wherein the virtual card is immediately presentable by the receiving mobile device at a point of sale terminal via NFC, and wherein the virtual card represents one of: a credit card, a debit card, a prepaid card, a loyalty card, a rewards card, and a coupon and, wherein provisioning the virtual card to the receiving mobile device comprises, in response to receiving the data for provisioning the virtual card, creating a new virtual card account corresponding to the virtual card type selected by the sender and designating the receiver as an intended recipient.

2. The method of claim 1 comprising receiving identification information associated with at least one of the sending mobile device and the receiving mobile device, wherein the identification information includes at least one of a phone number, a name, and an address.

3. The method of claim 1 wherein receiving the data for provisioning the virtual card includes communicating over at least one of an over-the-air and an Internet protocol (IP)-based communications network.

4. The method of claim 3 wherein communicating over an over-the-air communications network includes communicating over one of a general packet radio service (GPRS), enhanced data rates for GSM evolution (EDGE), code division multiple access (CDMA), 3G, 4G, and long term evolution (LTE) network.

5. The method of claim 3 wherein communicating over an IP-based network includes communicating over one of a Wi-Fi, worldwide interoperability for microwave access (Wi-Max), and an Ethernet network.

6. The method of claim 1 wherein receiving the data for provisioning the virtual card includes receiving an electronic, monetary deposit using at least one of hypertext transfer protocol (HTTP), transmission control protocol (TCP), short message service (SMS), CAT_TP, code division multiple access (CDMA), Bluetooth, general packet radio service (GPRS), global system for mobile communications (GSM), Wi-Fi, SMS point-to-point (PP), Bearer Independent Protocol (BIP), and user datagram protocol (UDP).

7. The method of claim 1 wherein provisioning the virtual card includes communicating over at least one of an over-the-air and an Internet protocol (IP)-based communications network.

8. The method of claim 7 wherein provisioning the virtual card includes provisioning a virtual card using at least one of a general packet radio service (GPRS), enhanced data rates for GSM evolution (EDGE), code division multiple access (CDMA), 3G, 4G, and long term evolution (LTE) network.

9. The method of claim 7 wherein communicating over an IP-based network includes communicating over one of a Wi-Fi, worldwide interoperability for microwave access (Wi-Max), and an Ethernet network.

10. The method of claim 1 wherein provisioning the virtual card includes provisioning an electronic, monetary account using at least one of hypertext transfer protocol (HTTP), transmission control protocol (TCP), short message service (SMS), CAT_TP, code division multiple access (CDMA), Bluetooth, general packet radio service (GPRS), global system for mobile communications (GSM), Wi-Fi, SMS point-to-point (PP), Bearer Independent Protocol (BIP), and user datagram protocol (UDP).

11. The method of claim 1 wherein provisioning the virtual card includes initiating one of an open loop or a closed loop account.

12. The method of claim 1 wherein the control message includes a control short message service (cSMS) message that is configured to access the wallet application associated with the receiving mobile device.

13. The method of claim 1 wherein provisioning the virtual card includes establishing a bearer independent protocol (BIP) using one of SMS PP and CAT_TP protocol to UICC/USIM without accessing the wallet application residing in the phone baseband memory.

14. The method of claim 1 comprising prompting the receiving mobile device to confirm the provisioning of the virtual card.

15. The method of claim 1 comprising storing the virtual card in a secure element in one of the sending mobile device and the receiving mobile device.

16. The method of claim 1 comprising encrypting at least one of the communications between the sending mobile device, the OTA provisioning server, and the receiving mobile device.

17. The method of claim 1 comprising authorizing the presentation of the virtual card.

18. The method of claim 17 wherein authorizing the virtual card transfer includes retrieving at least one of track I data, track II data, a routing number, a bank account number, a credit card number, an expiration date, a debit card number, and an automated clearing house (ACH) identifier.

19. An over-the-air (OTA) provisioning server for providing virtual card transfer between near field communications (NFC)-enabled mobile devices, the OTA provisioning server comprising:
 a receiving module for receiving, from a sending mobile device operated by a sender, data for provisioning a virtual card to a receiving mobile device, the data including a virtual card type selected by the sender from a plurality of virtual card types, a receiver for the virtual card, a recipient mobile device number corresponding to the receiving mobile device, and a monetary amount, and for accessing a database using the recipient mobile device number to obtain mobile device type information related to the receiving mobile device, wherein each of the sending mobile device and the receiving mobile device includes an NFC-enabled mobile phone device; and
 in response to determining that the mobile device type information indicates that the receiving mobile device is an NFC enabled mobile device, an account module for provisioning the virtual card to the receiving mobile device by sending a control message from the OTA provisioning server to the receiving mobile device that triggers a wallet application in the receiving mobile device to initiate downloading of the virtual card from the OTA provisioning server to the receiving mobile device, wherein the virtual card is immediately usable by the receiving mobile device at a point of sale terminal via NFC, wherein the virtual card represents one of: a credit card, a debit card, a prepaid card, a loyalty card, a rewards card, and a coupon and, wherein provisioning the virtual card to the receiving mobile device comprises, in response to receiving the data for provisioning the virtual card, creating a new virtual card account corresponding to the virtual card type and the monetary amount selected by the sender and designating the receiver as an intended recipient, and wherein the OTA provisioning server is implemented by at least one computer having associated hardware.

20. The OTA provisioning server of claim 19 wherein the receiving module receives identification information associated with at least one of the sender and the receiver, wherein the identification information includes at least one of a phone number, a name, and an address.

21. The OTA provisioning server of claim 19 wherein the data for provisioning the virtual card over at least one of an over-the-air and an Internet protocol (IP)-based communications network.

22. The OTA provisioning server of claim 21 wherein the receiving module communicates over an over-the-air communications network includes communicating over one of a general packet radio service (GPRS), enhanced data rates for GSM evolution (EDGE), code division multiple access (CDMA), 3G, 4G, and long term evolution (LTE) network.

23. The OTA provisioning server of claim 21 wherein the receiving module communicates over an IP-based network includes communicating over one of a Wi-Fi, worldwide interoperability for microwave access (Wi-Max), and an Ethernet network.

24. The OTA provisioning server of claim 19 wherein the receiving module receives the virtual card via at least one of hypertext transfer protocol (HTTP), transmission control protocol (TCP), short message service (SMS), CAT_TP, code division multiple access (CDMA), Bluetooth, general packet radio service (GPRS), global system for mobile communications (GSM), Wi-Fi, SMS point-to-point (PP), Bearer Independent Protocol (BIP), and user datagram protocol (UDP).

25. The OTA provisioning server of claim 19 wherein the account module provisions the virtual card by communicating over at least one of an over-the-air and an Internet protocol (IP)-based communications network.

26. The OTA provisioning server of claim 25 wherein the account module provisions the virtual card via at least one of a general packet radio service (GPRS), enhanced data rates for GSM evolution (EDGE), code division multiple access (CDMA), 3G, 4G, and long term evolution (LTE) network.

27. The OTA provisioning server of claim 25 wherein the account module provisions the virtual card via an IP-based network including one of a Wi-Fi, worldwide interoperability for microwave access (Wi-Max), and an Ethernet network.

28. The OTA provisioning server of claim 25 wherein the account module provisions the virtual card via at least one of hypertext transfer protocol (HTTP), transmission control protocol (TCP), short message service (SMS), CAT_TP, code division multiple access (CDMA), Bluetooth, general packet radio service (GPRS), global system for mobile communications (GSM), Wi-Fi, SMS point-to-point (PP), Bearer Independent Protocol (BIP), and user datagram protocol (UDP).

29. The OTA provisioning server of claim 19 wherein the virtual card is one of an open loop or a closed loop virtual card.

30. The OTA provisioning server of claim 19 wherein the control message includes a control short message service (cSMS) message that is configured to access the wallet application associated with the receiving mobile device.

31. The method of claim 19 wherein account module provisions the virtual card by establishing a bearer independent protocol (BIP) using one of SMS PP and CAT_TP protocol to UICC/USIM without accessing the wallet application residing in the phone baseband memory.

32. The OTA provisioning server of claim 19 wherein the sending mobile device prompts the receiving mobile device to confirm the transmission of the electronic, monetary deposit.

33. A computer readable medium having stored thereon computer executable instructions that when executed by the processor of a computer control the computer to perform steps comprising:
- at an OTA provisioning server:
  - receiving, from a sending mobile device operated by a sender, a virtual card intended for a receiving mobile device, the data including a virtual card type selected by the sender from a plurality of virtual card types, a receiver for the virtual card, and a recipient mobile device number corresponding to the receiving mobile device, wherein each of the sending mobile device and the receiving mobile device includes an NFC-enabled mobile phone device;
  - accessing a database using the recipient mobile device number to obtain mobile device type information related to the receiving mobile device; and
  - in response to determining that the mobile device type information indicates that the receiving mobile device is an NFC enables mobile device,
  - provisioning the virtual card to the receiving mobile device via an OTA interface, wherein provisioning the virtual card includes sending a control message from the OTA provisioning server to the receiving mobile device that triggers a wallet application in the receiving mobile device to initiate downloading of the virtual card from the OTA provisioning server to the receiving mobile device, wherein the virtual card is immediately presentable by the receiving mobile device at a point of sale terminal via NFC, and wherein the virtual card represents one of: a credit card, a debit card, a prepaid card, a loyalty card, a rewards card, and a coupon and, wherein provisioning the virtual card to the receiving mobile device comprises, in response to receiving the data for provisioning the virtual card, creating a new virtual card account corresponding to the virtual card type selected by the sender and designating the receiver as an intended recipient.

\* \* \* \* \*